(12) United States Patent
Decore et al.

(10) Patent No.: US 6,469,250 B1
(45) Date of Patent: Oct. 22, 2002

(54) TRUNKING PORT ACCESSORY

(75) Inventors: Raphael Decore, Parennes; Bertrand Decore, La Chapelle Saint Aubin, both of (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 24 days.

(21) Appl. No.: 09/690,847

(22) Filed: Oct. 18, 2000

(30) Foreign Application Priority Data

Oct. 18, 1999 (FR) .......................................... 99 12963

(51) Int. Cl.$^7$ ................................................ H02G 3/06
(52) U.S. Cl. ............................ 174/95; 176/48; 176/95; 176/96; 176/97; 52/287.1
(58) Field of Search .................... 174/48, 96, 97, 174/95; 52/287.1

(56) References Cited

U.S. PATENT DOCUMENTS 5,274,972 A * 1/1994 Hansen ........................ 174/48
5,550,322 A * 8/1996 Tynan ........................ 174/48
5,704,175 A * 1/1998 Lewis ........................ 174/48
5,756,933 A * 5/1998 Pitchford et al. ............. 174/48
5,998,732 A * 12/1999 Caveney et al. .............. 174/48
6,328,177 B2 * 12/2001 Goudal ........................ 174/48

FOREIGN PATENT DOCUMENTS

DE 2852483 A * 6/1980
FR 2280849 A * 2/1976
GB 2 254 966 10/1992

* cited by examiner

Primary Examiner—Dean A. Reichard
Assistant Examiner—Jinhee J Lee
(74) Attorney, Agent, or Firm—Young & Thompson

(57) ABSTRACT

A port accessory for trunking whose interior volume is divided into at least two compartments separated from each other by a partition wall and two cover sections associated with the respective compartments. In one compartment, of which the corresponding partition wall is a part, includes a longitudinal wall which is substituted for the partition wall and through which there is at least one port and a longitudinal engagement system for fastening it to the base section of the trunking. Applications include trunking for electrical devices.

38 Claims, 6 Drawing Sheets

TRUNKING PORT ACCESSORY

BACKGROUND OF THE INVENTION

1. Field of the Invention

The present invention relates generally to trunking used, for example, to support, house and protect various devices, in particular various electrical devices, and to support, house and protect cables, conductors, pipes or other equipments to which the devices are connected.

2. Description of the Prior Art

By definition, trunking has a base section, which has an open cross section, by means of which it is fixed to some kind of wall, or to some other kind of support, and a cover section which, to close the base section, is removably attached to it, for example clipped to it.

The invention relates more particularly to the situation in which the interior volume of the trunking, or to be more precise that of its base section, to which, for simplicity, the trunking will be systematically regarded as equivalent hereinafter, is divided transversely into at least two compartments which extend parallel to each other, for example side-by-side, in the longitudinal direction, and which are separated from each other by at least one wall, referred to hereinafter as a partition wall.

One compartment, referred to hereinafter as the installation compartment, is dedicated to the installation of devices and the other one, referred to hereinafter as the wiring compartment, is dedicated to the installation of cables or conductors and is possibly itself divided into two or more sub-compartments when, carrying currents at different voltages, the cables or conductors are preferably to be separated from each other.

With an arrangement of the above kind, it is advantageously possible to work in either compartment without necessarily interfering with the other one.

The height, or depth, of each compartment is entirely available for the devices or the cables or conductors concerned, without the devices or the cables or conductors interfering with each other.

In particular, referring to the installation compartment, the interior volume is entirely available for devices without it being necessary to pass cables or conductors below or alongside them, which, other things being equal, means that the overall height, for example, can be minimized.

However, the problem arises of passing the cables or conductors from the wiring compartment into the installation compartment when a device has to be connected to the cables or conductors.

In French patent No. 2 719 887, filed as application No. 94 05842 on May 11 1994, the partition wall through which the cables or conductors have to be passed is part of the base section of the trunking and is formed in one piece with the back of the base section.

It is therefore necessary to provide openings at intervals along the partition wall, in this example notches which open onto its free edge.

In the case of an extrusion, systematically forming such notches cannot fail to make fabrication more complex and consequently more costly.

What is more, at installation time, the notches are not necessarily at the locations that the installer would wish.

The same is substantially true of the disclosure of French patent No. 2 660 120, filed as application No. 90 03772 on Mar. 23 1990, in which the partition wall formed with the necessary openings or notches nevertheless constitutes a separate part rather than a part of the base section of the trunking and is removably attached to the back of the base section.

In French certificate of addition No. 2 280 849, filed as application No. 74 26398 on Jul. 30 1974, the partition wall is part of the cover section of a compartment of the trunking, with which it is formed in one piece, and this arrangement is also used in other embodiments.

However, as previously, it is necessary to provide openings from place to place in the partition wall for passing the cables or conductors through, either in advance or by forming such openings as and where required by cutting the partition wall, with the attendant disadvantages.

A general object of the present invention is an arrangement that provides a particularly simple way of avoiding the above disadvantages and which also has advantages of its own.

SUMMARY OF THE INVENTION

To be more precise, the present invention firstly provides a port accessory for trunking whose interior volume is divided into at least two compartments separated from each other by at least one partition wall which is part of a cover section associated with a first of the compartments, wherein, being intended to be locally substituted for the cover section of which the partition wall is part, the port accessory includes at least one longitudinal wall adapted to be substituted for the partition wall and through which there is at least one port and longitudinal engagement means which are adapted to be fastened to the base section of the trunking.

Thus the invention systematically employs a dedicated accessory including the required port.

All that is then required is to divide the cover section of the compartment concerned into two lengths and to insert the port accessory between them.

The required port is therefore obtained without it being necessary for the partition wall of the cover section in question to have any openings in it and without it being necessary to cut the partition wall in the absence of such openings.

Indeed, because the cover section is cut to length, the partition wall is locally eliminated and the port accessory according to the invention, which incorporates the required port, is simply substituted for it.

If required, the function of the port accessory according to the invention can be limited to providing the required port.

However, in accordance with a preferred development of the invention, the port accessory is also adapted to receive a device, in the manner of some kind of support.

This is therefore an additional benefit, further simplifying installation.

In all cases, the port accessory according to the invention is preferably adapted to have a plate clipped to it to form a cover.

It is then advantageously possible for the lengths of cover section between which the port accessory is installed to be cut to an approximate length.

The features and advantages of the invention will emerge further from the following description, which is given by way of example and with reference to the accompanying diagrammatic drawings.

DETAILED DESCRIPTION OF THE PREFERRED EMBODIMENTS

Figure 1:
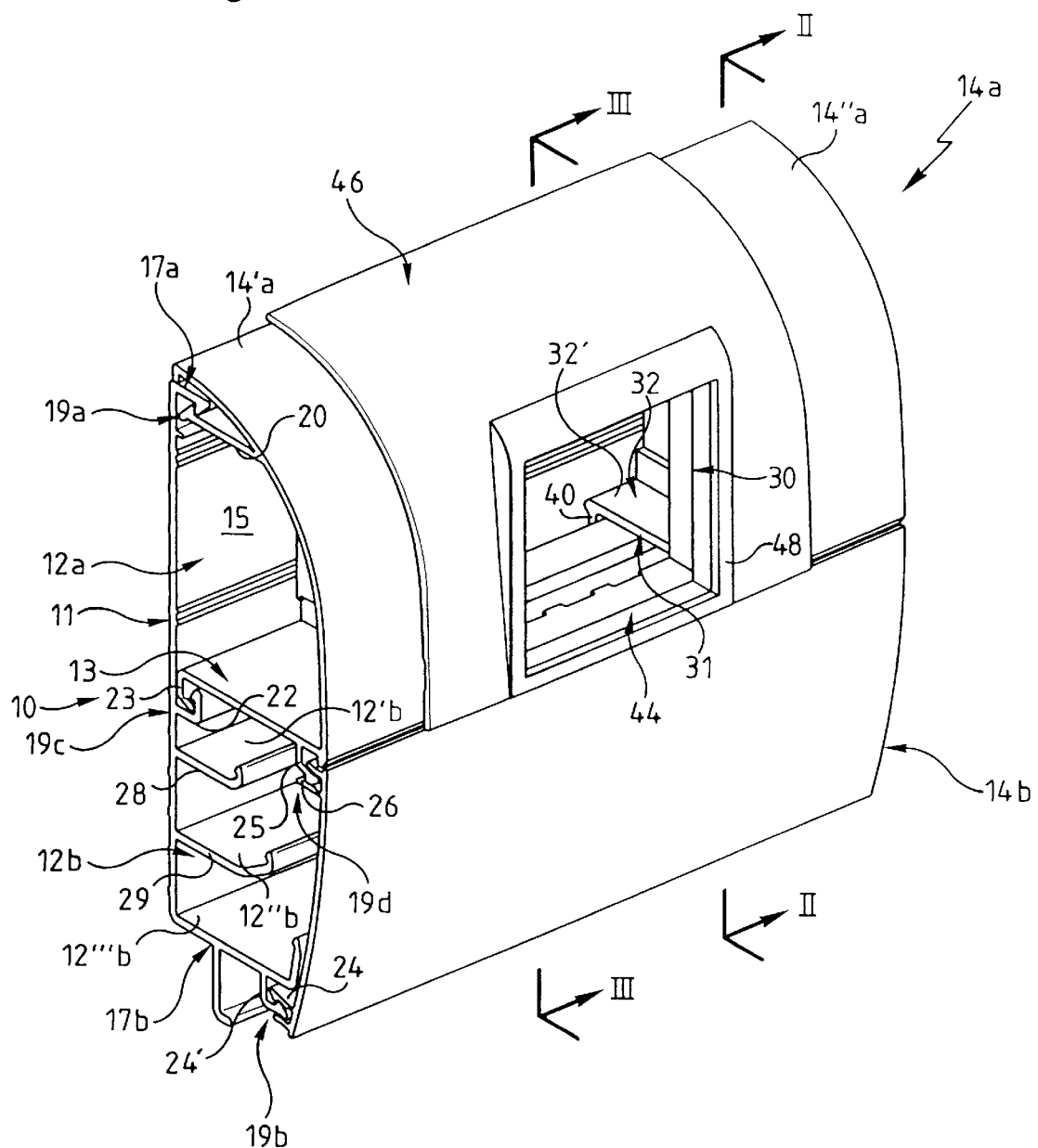
FIG. 1 is a perspective view of trunking equipped with a port accessory according to the invention.

FIGS. 1 to 4 and 10 show trunking 10 including, in a manner that is known in the art, on the one hand, a base section 11 whose interior volume is divided into at least two compartments 12a, 12b by at least one partition wall 13 and, on the other hand, two cover sections 14a, 14b which are respectively associated with the two compartments 12a, 12b and of one of which the corresponding partition wall 13 is part.

In a manner that is also known in the art, the base section 11 includes a flat back 15 which can be applied to any kind of wall or to any other kind of support, not shown.

It further includes two lateral flanges 17a, 17b extending along and substantially perpendicular to the longitudinal edges of the back 15.

In the embodiment shown in FIGS. 1 to 4 the lateral flanges 17a, 17b are very different heights.

As shown here, for example, the lateral flange 17a, which is the one intended to extend along the top longitudinal edge of the back 15 when the trunking 10 is installed as a baseboard along the bottom of a wall, has a height very much less than that of the opposite lateral flange 17b.

In the embodiments shown the two compartments 12a, 12b of the base section 11 are contiguous, with only a partition wall 13 between them.

A first of the compartments 12a, 12b in this instance the top compartment 12a, is normally dedicated to the installation of some kind of device, and in particular some kind of electrical devices, not shown.

It will therefore be referred to hereinafter sometimes as the "first compartment 12a", sometimes as the "top compartment 12a" and sometimes as the "installation compartment 12a".

Figure 2:
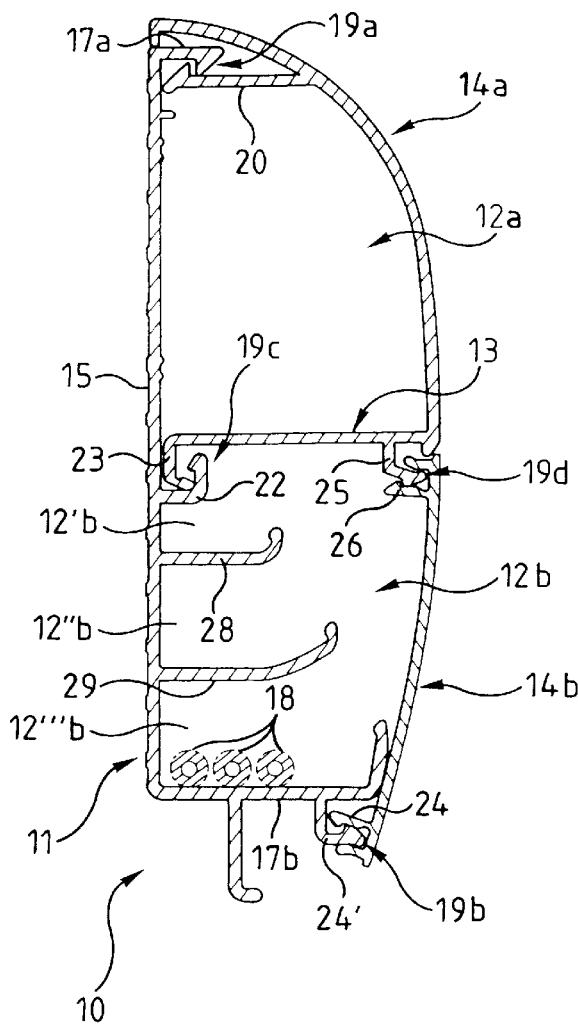
FIG. 2 is a view of it to a larger scale and in cross section taken along the line II—II in FIG. 1 which does not pass through the port accessory.
Figure 3:
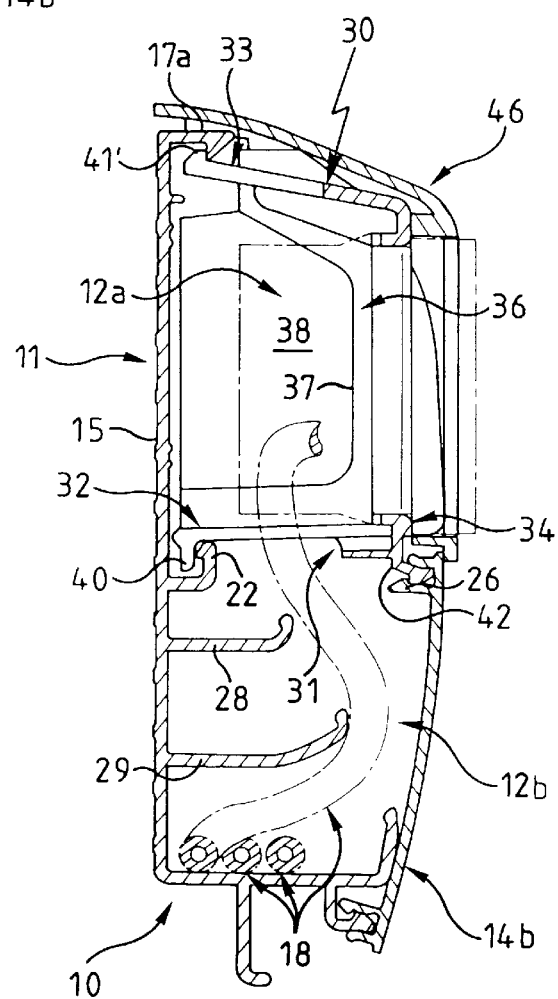
FIG. 3 is another view of it to the same scale as FIG. 2 and in cross section taken along the line III—III in FIG. 1 which does pass through the port accessory.

The second compartment, in this instance the bottom compartment 12b, is normally dedicated to the installation of electrical conductors or cables 18, as shown diagrammatically in dashed outline in FIGS. 2 and 3.

It will therefore be referred to hereinafter sometimes as the "second compartment 12b", sometimes as the "bottom compartment 12b" and sometimes as the "wiring compartment 12b"

In the embodiments shown, the partition wall 13 is part of the cover section 14a associated with the first compartment 12a.

The cover section 14a is very broadly curved because of the small height of the lateral flange 17a of the base section 11 in the embodiment shown in FIGS. 1 to 4.

It is held in place by clipping means 19a, 19c operative between it and the base section 11.

The clipping means 19a are operative between the lateral flange 17a of the base section 11 and a tongue 20 projecting for this purpose from the inside surface of the cover section 14a (see FIGS. 1 and 2).

The clipping means 19c are operative between a bracket 22 projecting for this purpose from the back 15 of the base section 11 and the partition wall 13, which has a corresponding rim 23 for this purpose.

The cover section 14b associated with the second compartment 12b is only slightly curved in the embodiment shown in FIGS. 1 to 10.

It is held in place by clipping means 19b, 19d.

The clipping means 19b are operative between the lateral flange 17b of the base section 11 and a tongue 24 projecting for this purpose from the inside surface of the cover section 14b. The lateral flange 17b of the base section 11 has in corresponding relationship a bracket 24' projecting from its outside surface (see FIGS. 1 and 2).

The clipping means 19d are operative between the partition wall 13, which is part of the cover section 14a associated with the first compartment 12a and to this end incorporates a bracket 25 parallel to its contour 23, and another tongue 26 projecting for this purpose from the inside surface of the cover section 14b and parallel to the previous tongue 24 (see FIGS. 1 and 2).

The clipping means 19D are operative between the partition wall 13, which is part of the cover section 14A associated with the first compartment 12A and to this end incorporates a bracket 25 parallel to its contour 23, and another tongue 26 projecting for this purpose from the inside surface of the cover section 14B and parallel to the previous tongue 24 (see FIGS. 1 and 2).

In the embodiments shown, the second compartment (wiring compartment) 12b is divided into sub-compartments 12'b, 12"b, 12'''b, by spaced parallel walls 28, 29 which are in one piece with the back 15 of the base section 11. They are different heights, and all their heights are less than the height of the corresponding lateral flange 17b of the base section 11. The height of the wall 28 farthest from the lateral flange 17b is less than the height of the wall 29 nearest it.

The preceding arrangements are not described in more detail here because they are well known in the art in themselves and/or are not relevant to the present invention.

Only elements necessary to understanding the invention are described hereinafter.

According to the invention, to form a port between the two compartments 12a, 12b of the trunking 10 a dedicated accessory 30, referred to hereinafter for convenience as a port accessory and incorporating the required port 31, is inserted transversely into the compartment of which the partition wall 13 is part, in this instance the first compartment 12a, between two successive lengths 14'a, 14"a of the cover section 14a thereof.

Intended to be locally substituted for the cover section 14a of which the partition wall 13 is part, the port accessory 30 according to the invention includes, in the embodiments shown, on the one hand, at least one longitudinal wall 32 adapted to be substituted for the partition wall 13 and through which there is at least one port, in this instance the required port 31, and, on the other hand, as described in more detail later, engagement means 33 which also extend longitudinally, parallel to the partition wall 13, and are adapted to be fastened to the base section 11 of the trunking 10.

In the embodiments shown, the port accessory 30 according to the invention further includes, on the one hand, a front wall 34 which forms a dihedron with the longitudinal wall 32 where it joins onto it, and, on the other hand, two spaced parallel transverse walls 36.

The front wall 34 reflects the shape of the cover section 14a concerned.

In the embodiment shown in FIGS. 1 to 4, it is therefore globally curved, like the cover section.

The transverse walls 36 therefore have a contour which substantially corresponds to the transverse profile of the compartment 12a concerned, i.e. the compartment 12a into which the port accessory 30 must be inserted.

At least one of the transverse walls 36 preferably has at least one port 37 through it.

As shown here, for example, this applies to both of the transverse walls 36.

In the embodiments shown, the port 37 in the transverse walls 36 is blocked by a press-out closure 38.

In the embodiments shown, the port 31 in the longitudinal wall 32 opens onto its free edge, i.e. the edge of the longitudinal wall 32 opposite the front wall 34.

Figure 5:
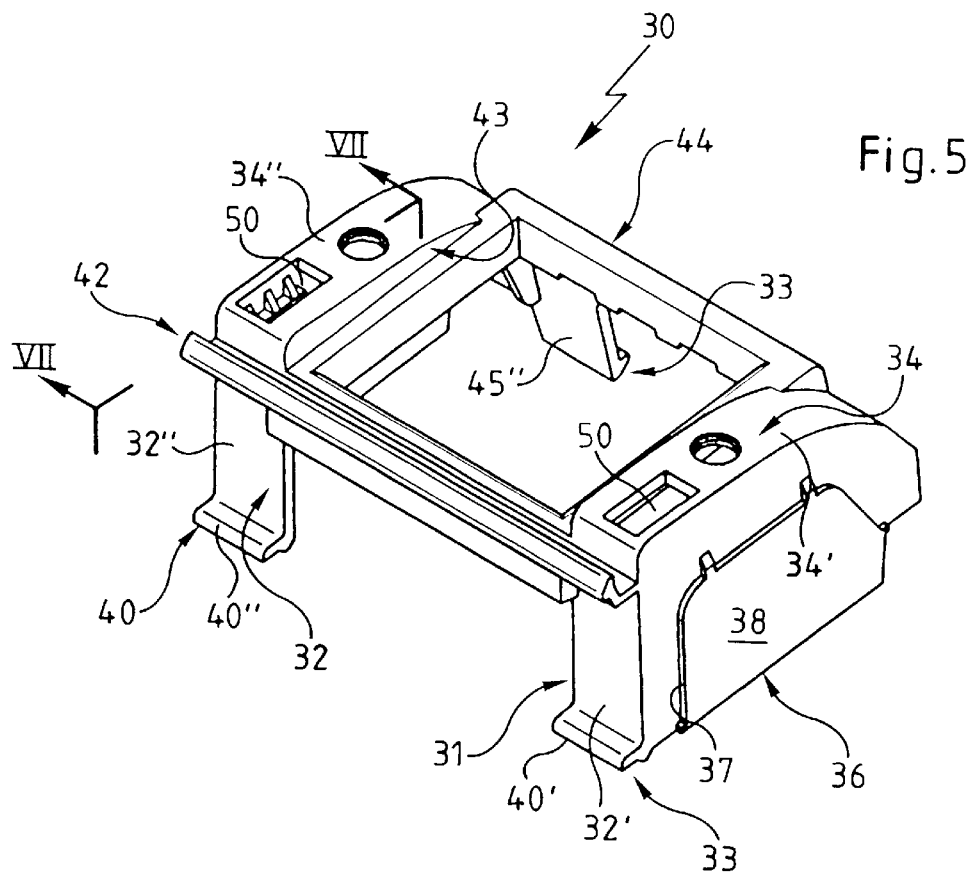
FIG. 5 is a perspective view of the port accessory according to the invention shown in isolation and from above.
Figure 6:
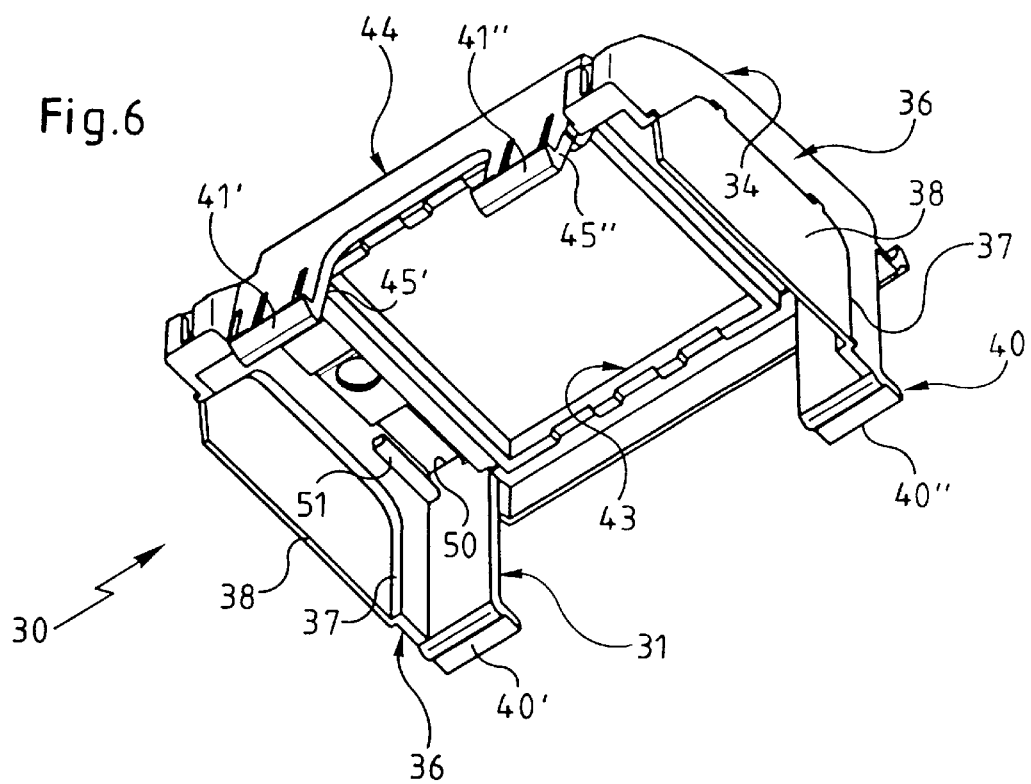
FIG. 6 is another perspective view of the port accessory, shown from below.
Figure 7:
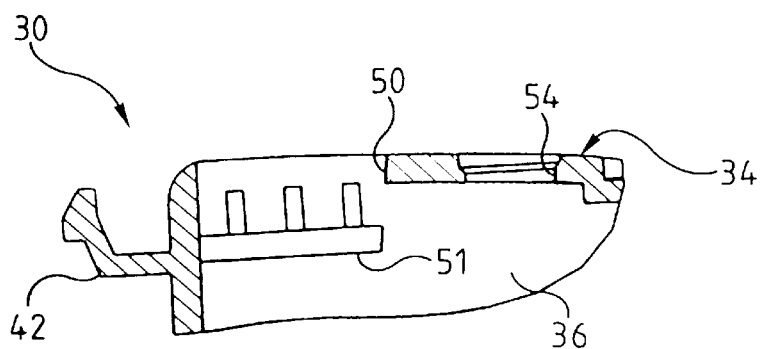
FIG. 7 is a partial view of it to a larger scale and in cross section taken along the line VII—VII in FIG. 5.
Figure 8:
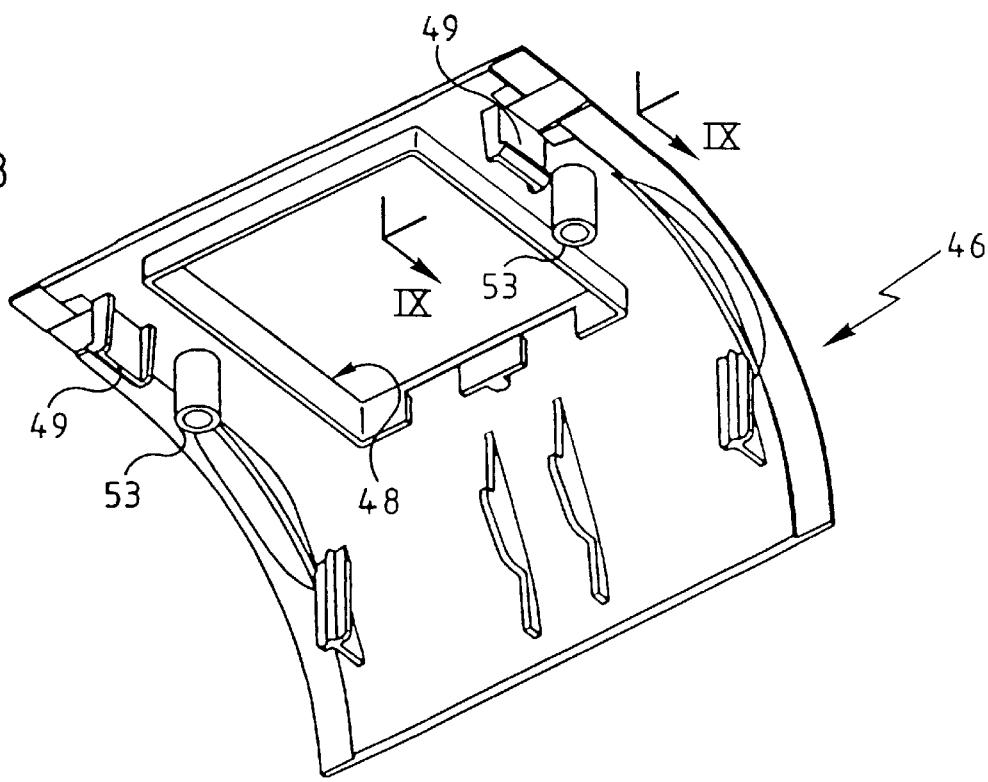
FIG. 8 is a perspective view to a different scale of a cover plate associated with the port accessory in accordance with the invention, shown from below.
Figure 9:
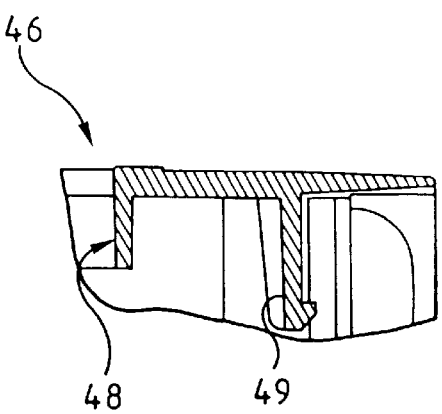
FIG. 9 is a partial view of the cover plate to a larger scale and in longitudinal section taken along the line IX—IX in FIG. 8.

The longitudinal wall 32 is therefore reduced to two spaced wall sections 32', 32" which adjoin a respective one of the two transverse walls 36 (see FIG. 5).

As shown here, for example, the dihedron that the front wall 34 forms with the longitudinal wall 32 is substantially a right-angle dihedron.

In the embodiments shown, the engagement means 33 for fastening the port accessory 30 to the base section 11 of the trunking 10 include at least one tongue 40 on the same side as the longitudinal wall 32 and projecting relative to it.

Designed to cooperate interengagement-fashion with the bracket 22 of the base section 11 instead of with the rim 23 of the partition wall 13, the tongue 40 in practice projects from the back of the free edge of the longitudinal wall 32.

The engagement means 33 for fastening the port accessory 30 to the base section 11 of the trunking 10 are in practice at least in part clipping means.

However, in the embodiments shown, the tongue 40 of the port accessory 30 is merely designed to engage under the bracket 22 of the base section 11.

It is therefore substantially rectilinear and plane.

In practice, because of the port 31, the tongue 40 is divided into two tongue sections 40', 40", one for each section 32', 32" of the longitudinal wall 32.

In the embodiments shown, the engagement means 33 for fastening the port accessory 30 to the base section 11 of the trunking 10 also include at least one hook 41', 41" which is at a distance from the longitudinal wall 32 and extends away from it.

In practice two spaced and aligned hooks 41', 41" are provided, substantially in corresponding relationship with a respective one of the aforementioned two tongue sections 40', 40".

Designed to clip onto the lateral flange 17a of the base section 11 instead of the tongue 20 of the cover section 14a, the two hooks 41', 41" are in practice on the same side as the edge of the front wall 34 opposite the longitudinal wall 32.

As is the case in the embodiments shown, the port accessory 30 according to the invention is preferably adapted to have the cover section 14b associated with the second compartment 12b of the trunking 10 clipped to it.

It therefore includes, projecting from the back of its longitudinal wall 32 in the vicinity of its front wall 34, a bracket 42 adapted to be substituted for the bracket 25 of the partition wall 13 of the cover section 14a associated with the first compartment 12a and which has a configuration similar to that of the bracket 25.

The bracket 42 of the port accessory 30 is therefore adapted to clip onto the tongue 26 of the cover section 14b associated with the second compartment 12b.

As is also the case in the embodiments shown, the port accessory 30 according to the invention is preferably adapted to receive a device in the manner of some kind of support.

To this end, its front wall 34 has an opening 43 in it which receives a frame 44 intended to extend substantially parallel to the back 15 of the base section 11 of the trunking 10.

The front wall 34 is therefore essentially reduced to two crossmembers 34', 34" substantially continuous with the respective wall sections 32', 32" of the longitudinal wall 32 (see FIG. 5).

On the side opposite the longitudinal wall 32 the frame 44 extends slightly beyond the front wall 34, and therefore projects relative to it, and two elastically deformable lugs 45', 45" of which the respective hooks 41', 41" are part extend locally from it, along its corresponding edge.

As is also the case in the embodiments shown, the port accessory 30 according to the invention is preferably adapted to have a cover plate 46 clipped to it.

Designed to be locally substituted for the cover section 14a of the first compartment 12a, and covering the two lengths 14'a, 14"a of the latter at its ends, the cover plate 46 is generally curved, reflecting the shape of the cover section 14a.

In line with the frame 44 of the port accessory 30, it is shaped to cover the frame 44 and incorporates an opening 48 to provide free access to the frame.

On respective opposite sides of the opening 48 the cover plate 46 has two clips 49 projecting from its inside face (see FIG. 8) by means of which, after it has been inserted into openings 50 provided for this purpose and in corresponding relationship in the front wall 34 of the port accessory 30, it is adapted to interengage with detents 51 also projecting for this purpose and in corresponding relationship from the transverse wall 36 of the port accessory 30.

In the embodiments shown, the cover plate 46 also has two projecting pillars 53 on its inside surface adapted to cooperate, for locating and centering purposes, with two holes 54 provided for this purpose and in corresponding relationship in the front wall 34 of the accessory 30.

The port accessory 30 according to the invention is used as follows, for example.

Figure 4:
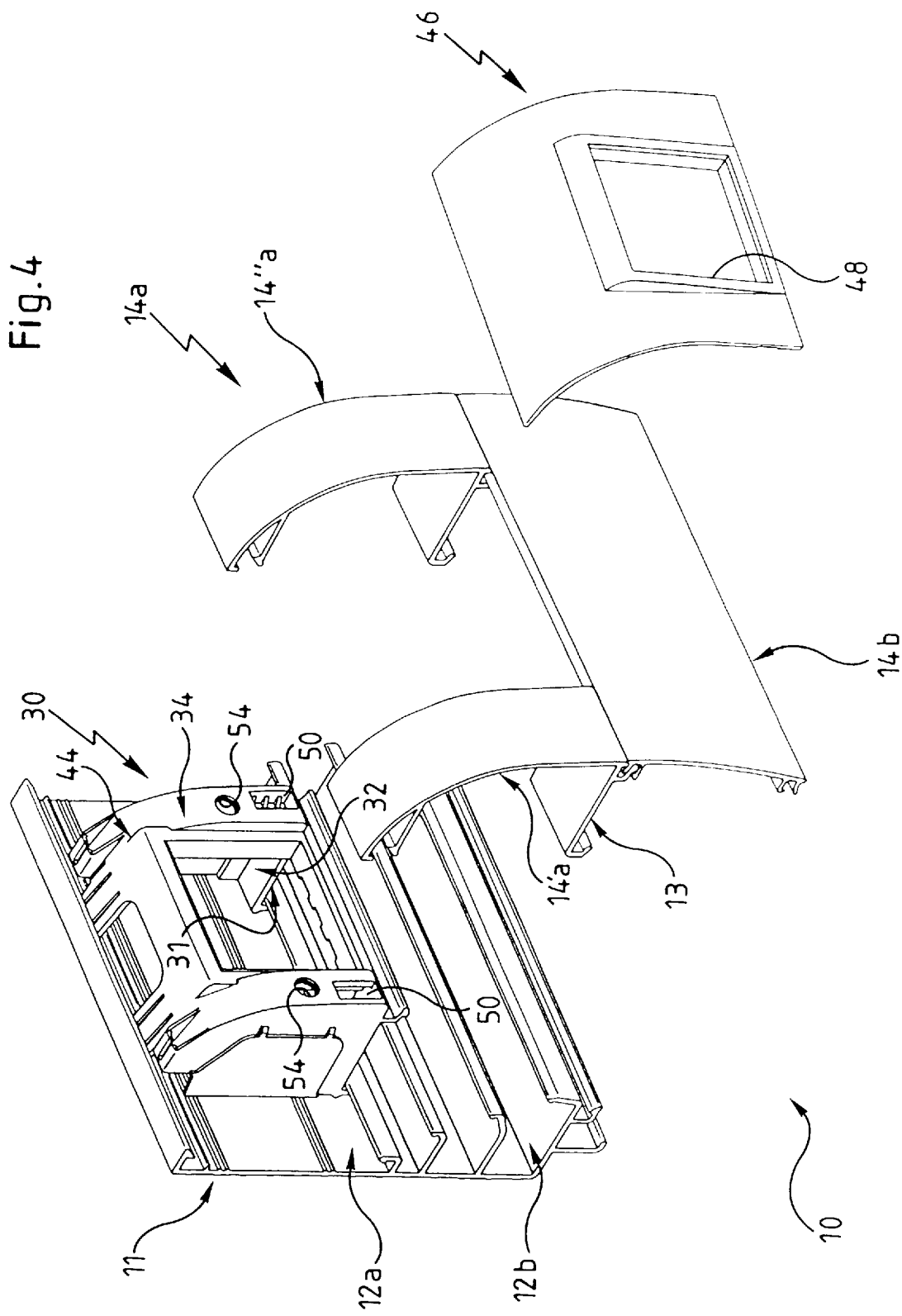
FIG. 4 is an exploded perspective view of it to a smaller scale.

Initially, and as shown in FIG. 4, the port accessory 30 is clipped into the first compartment 12a of the trunking 10.

The cable(s) or conductor(s) 18 necessary for wiring the corresponding device are then withdrawn from the second compartment 12b of the trunking 10 and inserted into the port accessory 30 through the port 31 that the latter includes specifically for this purpose.

Once it has been wired, the device concerned is attached to the frame 44 of the port accessory 30.

All that is then required is to close the first compartment 12a on either side of the port accessory 30, using lengths 14'a, 14"a of the corresponding cover section 14a, to close the second compartment 12b with the cover section 14b, and to fit the associated cover plate 46 to the port accessory 30.

Thus, in accordance with the invention, the trunking 10 then has, in the compartment 12a of whose cover section 14a the partition wall 13 is part, a port accessory 30 which is inserted between two successive lengths 14'a, 14"a of the cover section 14a and which has a port 31 through which its two compartments 12a, 12b communicate with each other.

Figure 10:
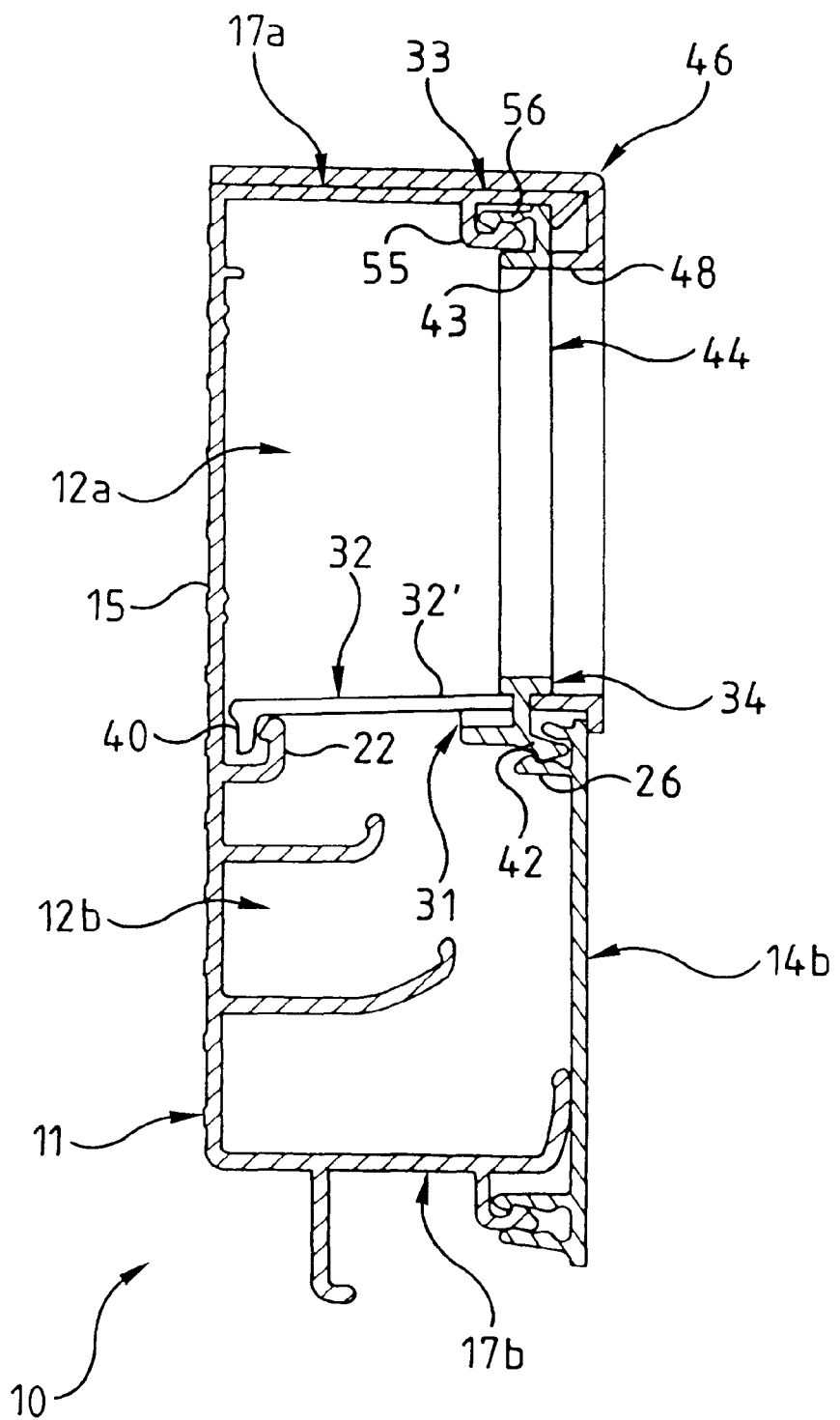
FIG. 10 is a view in cross section analogous to that of FIG. 3 for a different embodiment of the trunking and of the port accessory according to the invention.

In the embodiment shown in FIG. 10, the two lateral flanges 17a, 17b of the base section 11 of the trunking 10 are of substantially the same height.

Consequently, the front wall 34 of the port accessory 30 according to the invention is substantially straight and, when fitted, extends substantially parallel to the back 15 of the base section 11.

The other features are substantially the same as previously described.

Accordingly, in FIG. 10, the same reference numbers designate the same parts.

However, on the side opposite the longitudinal wall 32, the engagement means 33 include a tongue 56 adapted to cooperate with a bracket 55 projecting from the corresponding lateral flange 17a of the base section 11 to achieve a clipping effect of the same type as that operative between the bracket 42 and the tongue 26 of the cover section 14b on the same side as the longitudinal wall 32.

Of course, the present invention is not limited to the embodiments described and shown, but encompasses all variants thereof.

There is claimed:

1. A port accessory for trunking comprising a base section including a back adapted to bear against a support, said base section having an interior volume divided into at least two compartments separated from each other by at least one partition wall which is a part of a cover section associated with a first of said compartments, wherein, being intended to be locally substituted for said cover section of which said partition wall is a part, said port accessory includes at least one longitudinal wall extending substantially from said cover section to said back and through which there is at least one port and longitudinal engagement means which are adapted to be fastened to said base section of said trunking.

2. The port accessory claimed in claim 1, wherein said engagement means are at least partly clipping means.

3. The port accessory claimed in claim 1, wherein said engagement means include at least one tongue on the same side as said longitudinal wall and projecting relative thereto.

4. The port accessory claimed in claim 3, wherein said tongue projects from the back of said longitudinal wall.

5. The port accessory claimed in claim 1, wherein said engagement means include at least one hook at a distance from said longitudinal wall and extending away from it.

6. The port accessory claimed in claim 1, including a front wall which forms a dihedron with said longitudinal wall where it joins onto it.

7. The port accessory claimed in claim 5, wherein said hook(s) are on the side of said front wall opposite said longitudinal wall.

8. The port accessory claimed in claim 6, wherein said front wall reflects the shape of said cover section concerned.

9. The port accessory claimed in claim 8, wherein said front wall is globally curved.

10. The port accessory claimed in claim 8, wherein said front wall is substantially straight.

11. The port accessory claimed in claim 1, including two spaced transverse walls.

12. The port accessory claimed in claim 11, wherein at least one of said transverse walls has at least one port in it.

13. The port accessory claimed in claim 12, wherein said port in a transverse wall is blocked by a press-out closure.

14. The port accessory claimed in claim 1, wherein said port in said longitudinal wall opens onto the free edge of the latter.

15. The port accessory claimed in claim 1, adapted to have a cover section associated with a second compartment clipped to it.

16. The port accessory claimed in claim 15, including a bracket projecting from the back of its longitudinal wall adapted to cooperate in clipping-fashion with a tongue of said cover section.

17. The port accessory claimed in claim 1, adapted to receive a device in the manner of some kind of support.

18. The port accessory claimed in claim 6, wherein its front wall has an opening receiving a frame.

19. The port accessory claimed in claim 1, adapted to have a cover plate clipped to it.

20. Trunking comprising a base section including a back adapted to bear against a support, said base section having an interior volume is divided into at least two compartments separated from each other by at least one partition wall and two cover sections which are respectively associated with the two compartments and with one of which the corresponding partition wall forms a part, wherein it includes, in the compartment of whose cover section the partition wall is a part, inserted between two successive lengths of the cover section, a port accessory which, being intended to be locally substituted for said cover section of which said partition wall is a part, includes at least one longitudinal wall extending substantially from a said cover section to said back and through which there is at least one port and longitudinal engagement means which are adapted to be fastened to said base section of said trunking.

21. The trunking claimed in claim 20, wherein said engagement means are at least partly clipping means.

22. The trunking claimed in claim 20, wherein said engagement means include at least one tongue on the same side as said longitudinal wall and projecting relative thereto.

23. The trunking claimed in claim 22, wherein said tongue projects from the back of said longitudinal wall.

24. The trunking claimed in claim 20, wherein said engagement means include at least one hook at a distance from said longitudinal wall and extending away from it.

25. The trunking claimed in claim 20, wherein said port accessory includes a front wall which forms a dihedron with said longitudinal wall where it joins onto it.

26. The trunking claimed in claim 24, wherein said hook(s) are on the side of a front wall opposite said longitudinal wall.

27. The trunking claimed in claim 25, wherein said front wall reflects the shape of said cover section concerned.

28. The trunking claimed in claim 27, wherein said front wall is globally curved.

29. The trunking claimed in claim 27, wherein said front wall is substantially straight.

30. The trunking claimed in claim 20, wherein said port accessory includes two spaced transverse walls.

31. The trunking claimed in claim 30, wherein at least one of said transverse walls has at least one port in it.

32. The trunking claimed in claim 31, wherein said port in a transverse wall is blocked by a press-out closure.

33. The trunking claimed in claim 20, wherein said port in said longitudinal wall opens onto the free edge of the latter.

34. The trunking claimed in claim 20, wherein said port accessory is adapted to have a cover section associated with a second compartment clipped to it.

35. The trunking claimed in claim 34, wherein said port accessory includes a bracket projecting from the back of its longitudinal wall adapted to cooperate clipping-fashion with a tongue of said cover section.

36. The trunking claimed in claim 20, wherein said port accessory is adapted to receive a device in the manner of some kind of support.

37. The trunking claimed in claim 25, wherein said front wall has an opening receiving a frame.

38. The trunking claimed in claim 20, wherein said port accessory is adapted to have a cover plate clipped to it.

* * * * *